Figure 7:
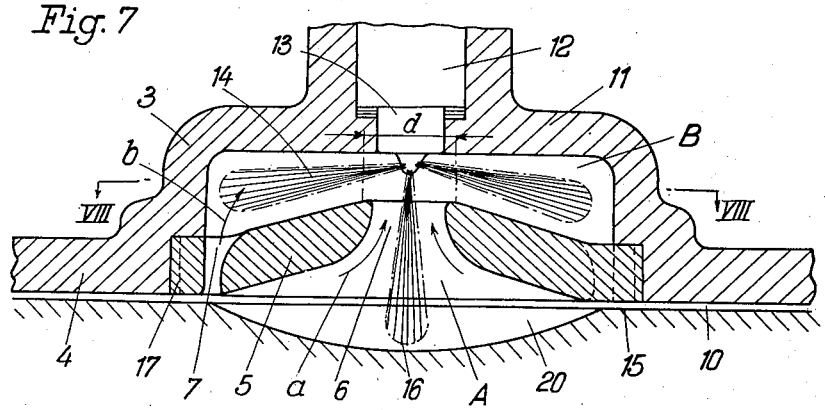

Nov. 26, 1940.                W. BOXAN                2,223,090
                      INTERNAL COMBUSTION ENGINE
                      Filed Aug. 10, 1936        3 Sheets-Sheet 1
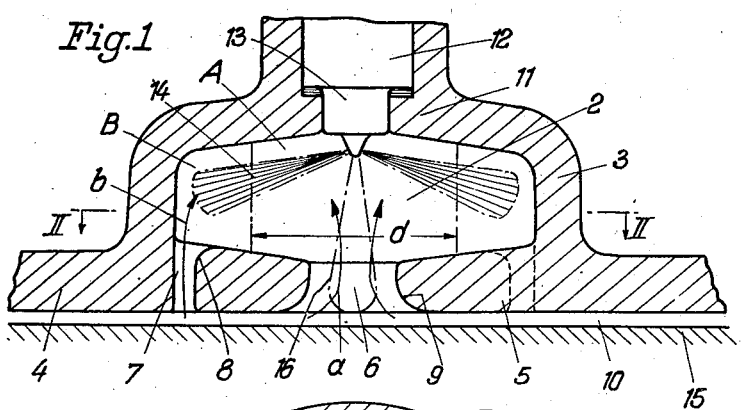
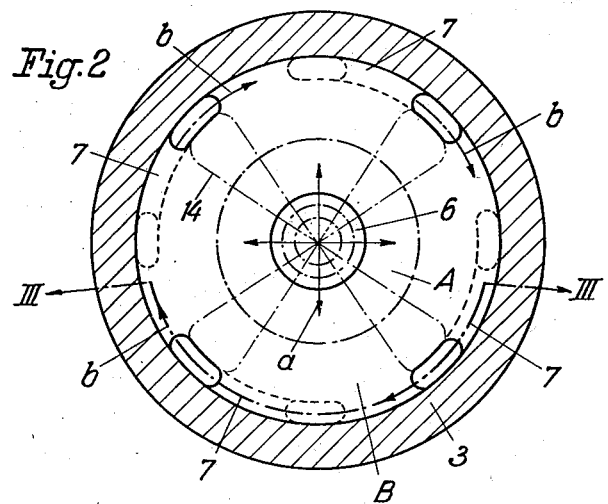
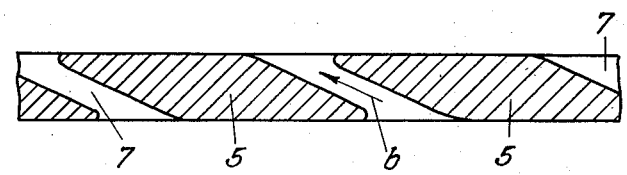
Inventor:
W. Boxan

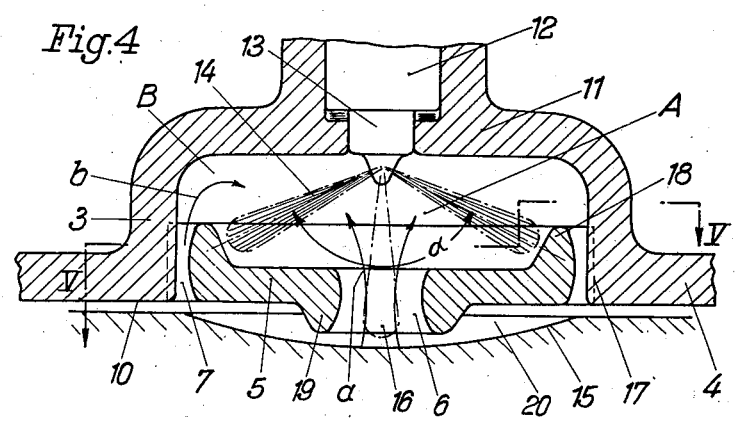
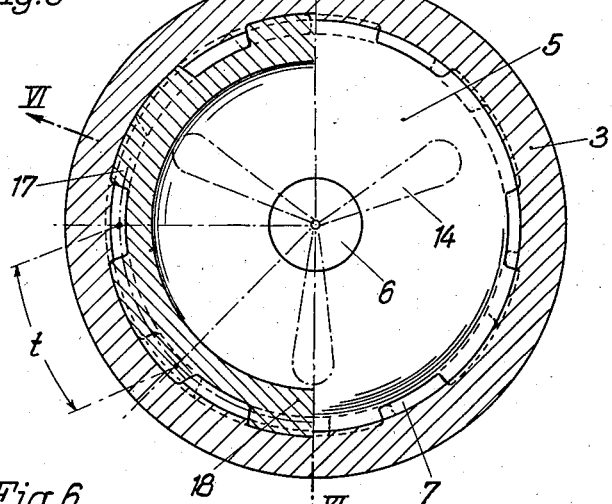
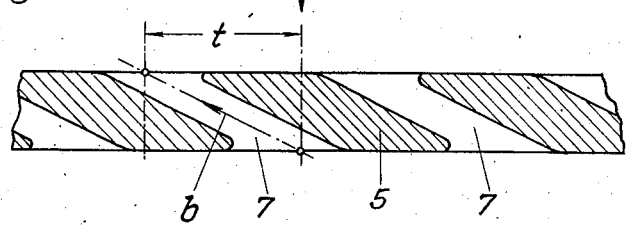

Nov. 26, 1940. W. BOXAN 2,223,090
INTERNAL COMBUSTION ENGINE
Filed Aug. 10, 1936   3 Sheets-Sheet 3

Inventor:
W. Boxan

Patented Nov. 26, 1940

2,223,090

UNITED STATES PATENT OFFICE 2,223,090

INTERNAL COMBUSTION ENGINE

Walter Boxan, Zschopau, Germany, assignor to Auto Union Aktiengesellschaft, Chemnitz, Germany Application August 10, 1936, Serial No. 95,256
In Germany August 12, 1935

6 Claims. (Cl. 123—33)

This invention relates to an air-compressing internal combustion engine, more particularly a vehicle engine, with self-ignition, airless injection and a precombustion chamber which is in communication with the combustion chamber through throttling openings.

It is known to inject the fuel directly into the combustion chamber (jet atomisation). In this case the fuel is taken up by a substantially quiescent (stagnant) mass of air, which reaches its self-ignition temperature without further losses of energy, that is already when starting or during idle running. Although such engines start reliably, they suffer, owing to the combustion pressures acting directly on the power piston, from harsh running (Diesel knock) which makes them unsuitable for certain uses, more particularly as driving engines having a high speed of revolution for motor vehicles.

It has also been proposed to inject the fuel only indirectly, that is into a precombustion chamber (ignition atomisation). In this case, there is imparted to that part of the air charge which is pushed over into the precombustion chamber an additional motion, which assists the working up of the fuel in the precombustion chamber. In this case the fuel is taken up by an eddying (rotating) mass of air. Such engines run very smoothly, but the final compression temperature required for self-ignition is reached only when the engine is running, that is, has become warmed up. When starting, however, in idle running the energy losses of the pushed-over part of the air are so great that the engine can only be kept in operation by auxiliary means, for instance sparking plugs. Such additional arrangements are however very undesirable for reasons of construction, operation and economy.

The object of the invention is to unite the advantages of these two methods, while avoiding their disadvantages, and this is effected through such an arrangement of the throttling openings between the precombustion chamber and the combustion chamber that a portion of the air charge is pushed over in a substantially eddying state and a second part in a substantially quiescent state into the precombustion chamber, the fuel being injected partly into the eddying and partly into the quiescent part of the air. By this means reliable ignition and combustion combined with smooth running is obtained independently of the operative state of the engine. That portion of the fuel which is taken up by the quiescent (stagnant) air charge in this case ensures the self-ignition and thereby initiates the combustion of that portion of the fuel which is taken up by the eddying (rotating) air charge. Only the former, usually smaller portion of the air charge experiences a sudden increase in pressure, whereas the latter, usually greater portion of the air charge experiences only a gradual increase in pressure. The initially great increase in pressure, which is in the region of the upper dead centre, can thus not cause harsh running, as it is very soon overtaken by the final, gradual pressure increase which comes in the region of the expansion stroke. The result is therefore actually obtained, that the ignition difficulties in starting and idle running are overcome without any further auxiliary means and that smooth running of the engine is ensured in all circumstances, even in the higher speeds of revolution.

Figure 8:
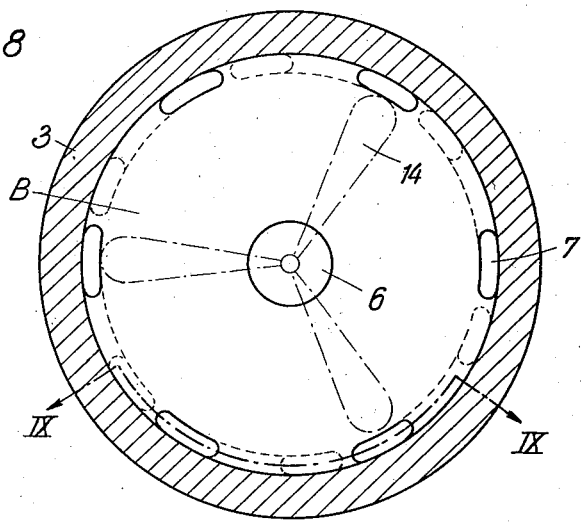
Figure 9:
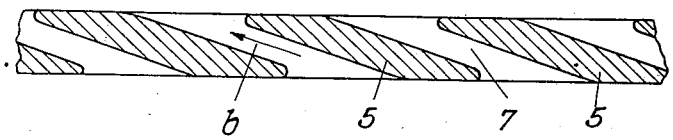

The arrangement according to the invention is illustrated in the drawings by three constructional examples:

Fig. 1 shows a vertical main section through the first precombustion chamber type, Fig. 2 a section on line II—II of Fig. 1, Fig. 3 a section on line III—III of Fig. 2, Fig. 4 a vertical main section through a second precombustion chamber type, Fig. 5 a section on line V—V of Fig. 4, Fig. 6 a section on line VI—VI of Fig. 5, Fig. 7 a main section through a third precombustion chamber type, Fig. 8 a section on line VIII—VIII of Fig. 7 and Fig. 9 a section on line IX—IX of Fig. 8.

In the first constructional example shown in Figs. 1 to 3 the precombustion chamber is connected by its cylindrical wall 3 with the bottom 4 of the cylinder cover. In the bottom 5 of the precombustion chamber 2 throttling openings are provided, which consist of a central passage 6 and four tangential passages 7. The tangential passages 7 are arranged circumferentially around the central passage 6 and are of helical shape at the periphery of the precombustion chamber 2. The places 8 where the tangential passages 7 open into the precombustion chamber 2 and the places 9, where the central passage 6 opens into the cylinder space 10 are well rounded off. In the cover wall 11 of the precombustion chamber 2 the injection nozzle 12 is mounted coaxially with the central passage 6, the nozzle cap 13 being at the top about flush with the chamber wall 11. The fuel is injected in the form of four jets 14 which are distributed radially in the direction of the precombustion chamber wall 3, without coming in contact with the latter.

During the upward stroke of the piston 15 (compression stroke) the charging-air is pushed over from the cylinder space 10 into the precombustion chamber 2. That portion of the charge which flows through the central passage 6 in the sense of the arrow $a$ spreads out substantially quiescently, that is without any additional conversion of pressure energy into velocity energy, in the precombustion chamber 2, until it fills substantially the zone A of the diameter $d$. That portion of the charge which flows through the tangential passages 7 in the sense of the arrow $b$ spreads out in an eddying fashion however, that is to say with an additional conversion of pressure energy into velocity energy, in the precombustion chamber 2, the circular eddying being formed in the latter, which fills the zone B. The boundary given by the measurement $d$ between the zones A, B depends of course on the ratio of the cross-sections of the passages 6, 7. Preferably, the volume of the zone B is greater than the volume of the zone A. Now, if the fuel be injected, as is usual, somewhat before the upper dead centre, the jets 14 will first pierce the quiescent part of the air in the zone A and will be in part consumed therein, before they pass into the eddying part of the air of the zone B, where they will be entirely consumed. Self-ignition of the mixture will then start in the zone A, as the quiescent glowing mass of air in this zone first reaches the self-ignition temperature of the fuel in all circumstances. This mass of air, when being pushed over, suffers no heat losses, partly owing to the small amount of throttling in the passage 6 and partly owing to its insulation in the eddying belt of the zone B. The fuel passing into the zone B is immediately churned up, that is mechanically worked up in a thorough manner, but it only reaches its self-ignition temperature, on being further compressed through the compression wave due to the precombustion in the zone A. The combustion will then take place suddenly with a great increase of pressure in the precombustion chamber 2, causing the mixture to be blown out by way of the throttling openings 6, 7 into the combustion space 10. Through the rounding-off of the inlet places 8, 9 on either side it is possible to cause the throttling resistance of the passage 6 to fall during the inflow and that of the passages 7 during the outflow. Owing to the increase of pressure in the precombustion chamber, the mixture will flow back into the combustion chamber during the return flow by way of the passages 7 with circular movement and during the return flow by way of the passage 6 with radial movement. The air charge is thereby completely mixed with the mixture and a complete main combustion is obtained.

In the constructional example shown in Figures 4 to 6, the bottom 5 of the precombustion chamber 2 is formed as an incandescent insertion, which is fixed by means of a thread 17 directly in the wall 3. In this case six tangential passages 7 are provided. The tangential passages 7 terminate towards the precombustion chamber side and the central passage 6 towards the combustion space side in ribs 18, 19. The fuel is injected in three jets 14 in the direction of the bottom 5 between the passages 6, 7 at such an inclination that that part of the precombustion chamber 2 which is above the jet cone (of the angle $\alpha$) corresponds substantially to the eddying zone B and that portion which is below the same to the quiescent zone A. The jets of fuel 14 thus play half in each zone A, B and are consumed to an equal extent in the two. Below the precombustion chamber bottom 5 a cavity 20 is preferably provided in the cylinder end 15. Nothing is changed thereby as regards the mode of operation of the engine as compared with the first constructional example. The incandescent insertion which is the most heavily stressed part is easy to make. Through its catalytic action it assists the self-ignition of the fuel. Moreover, the self-ignition of the fuel in the zone A is assisted by the large jet surface.

In both constructional examples it is also possible according to the invention to employ a further central injection jet 16, which is directed towards the combustion space 10 and reaches to the bottom outlet of the passage 6. By this means the portion of the air resting in the passage 6, which presents the most favorable ignition conditions, can be saturated with fuel.

In the third constructional example, Figures 7 to 9, the bottom 5 of the precombustion chamber 2, which is constructed as an incandescent insertion is arched towards the injection nozzle 12. The eddying zone B extends preferably between the walls 5, 11, whereas the quiescent zone A which is reduced to the diameter $d$ extends through the central passage 6 to the cavity 20 of the piston. The fuel is injected in the form of three jets 14 arranged like the rays of a star into the zone B and in the form of a central jet 16 into the zone A, so that each of these zones receives an exactly apportioned quantity of fuel. Since the retardation of ignition in the part of the zone A between the precombustion chamber and piston head is less than in the upper part, the self-ignition of the fuel will be accelerated even, if a smooth running of the engine as in the preceding constructional examples cannot be obtained owing to the first ignition pressures acting directly on the piston head.

The arrangement according to the invention unites in a constructionally simple way two actions which coincide as regards the time taken and therefore any coacting result both in a continuous combustion and in a continuous atomisation. The constructional means for uniting these methods can of course be still further modified, without exceeding the scope of the invention. Which method predominates depends on the requirements and can be controlled as desired, both by a suitable distribution of the air over the precombustion chamber and the combustion space and by a suitable dimensioning of the zones A, B. The question of the air distribution goes hand in hand with the question of the fuel distribution through suitable jet formation.

What I claim is:

1. In an air compressing internal combustion engine with self-ignition airless injection, a cylinder having a combustion chamber therein and a precombustion chamber having a cylindrical side wall and a bottom separating said chambers, said bottom having a central axial passage and a plurality of side passages therein connecting said chambers, said side passages being disposed helically of the cylinder axis and opening into the precombustion chamber tangentially of the cylindrical side wall, and means for injecting fuel into the precombustion chamber, said precombustion chamber being in the form of a shallow cylindrical body of less diameter than said cylinder.

2. In an air compressing internal combustion engine with self-ignition airless injection, a cylinder having a combustion chamber therein and a precombustion chamber having a cylindrical side wall and a bottom separating said chambers, said bottom having a central axial passage and a plurality of side passages therein connecting said chambers, said side passages being disposed helically of the cylinder axis and opening into the precombustion chamber tangentially of the cylindrical side wall, and means for injecting fuel into the precombustion chamber, said fuel injecting means being constructed and arranged to inject a number of fuel jets corresponding to at least one-half of a total number of side passages, the axes of the jets being directed toward the ends of the side passages opening into said precombustion chamber.

3. In an air compressing internal combustion engine with self-ignition airless injection, a cylinder having a combustion chamber therein and a precombustion chamber having a cylindrical side wall and a bottom separating said chambers, said bottom having a central axial passage and a plurality of side passages therein connecting said chambers, said side passages being disposed helically of the cylinder axis and opening into the precombustion chamber tangentially of the cylindrical side wall, and means for injecting fuel into the precombustion chamber, said fuel injecting means being constructed and arranged to inject a number of fuel jets corresponding to at least one-half of a total number of side passages, the axes of the jets being directed toward the ends of the side passages opening into said precombustion chamber, said injecting means also being constructed and arranged to inject a fuel jet toward said bottom and into the central passage.

4. In an air compressing internal combustion engine with self-ignition airless injection, a cylinder having a combustion chamber therein and a precombustion chamber having a cylindrical side wall and a bottom separating said chambers, said bottom having a central axial passage and a plurality of side passages therein connecting said chambers, said side passages being disposed helically of the cylinder axis and opening into the precombustion chamber tangentially of the cylindrical side wall, and means for injecting fuel into the precombustion chamber, the ends of the side passages opening into the precombustion chamber being rounded and the end of the central passage adjacent the combustion chamber being also rounded.

5. An engine as claimed in claim 1, characterized by the provision of rib-like projections surrounding the ends of the side passages opening into the precombustion chamber and the end of the axial passage opening into the combustion chamber.

6. In an air compressing internal combustion engine with self-ignition airless injection, a cylinder having a combustion chamber therein and a precombustion chamber having a cylindrical side wall and a bottom separating said chambers, said bottom having a central axial passage and a plurality of side passages therein connecting said chambers, said side passages being disposed helically of the cylinder axis and opening into the precombustion chamber tangentially of the cylindrical side wall, and means for injecting fuel into the precombustion chamber, the bottom of the precombustion chamber being arched towards said injection means.

WALTER BOXAN.